May 29, 1934.  L. A. SMITH  1,961,092
AUTOMATIC WATERER
Filed July 11, 1933
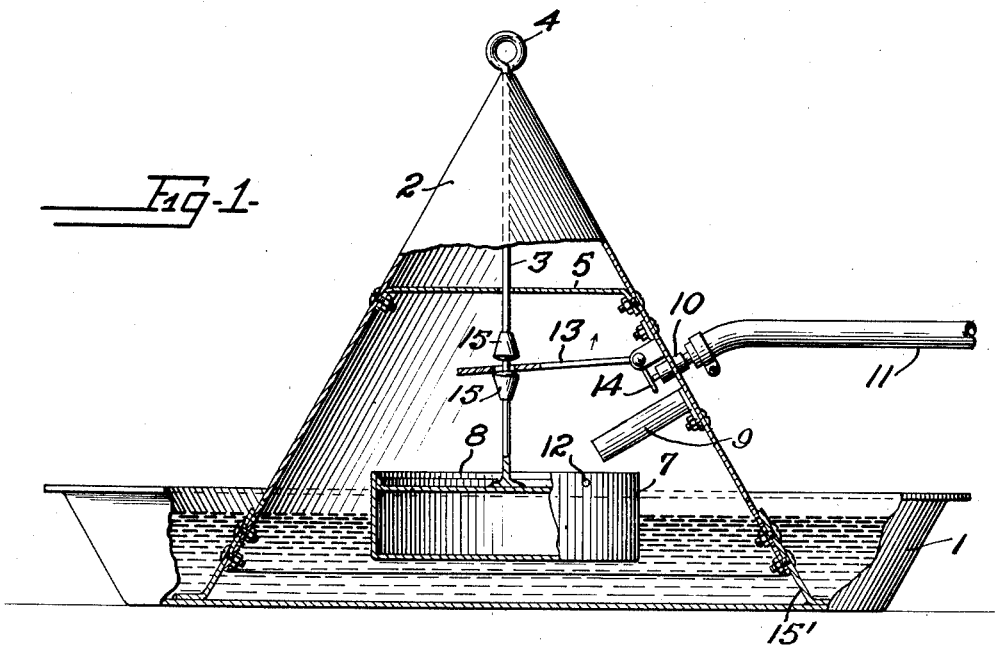
Fig-1-
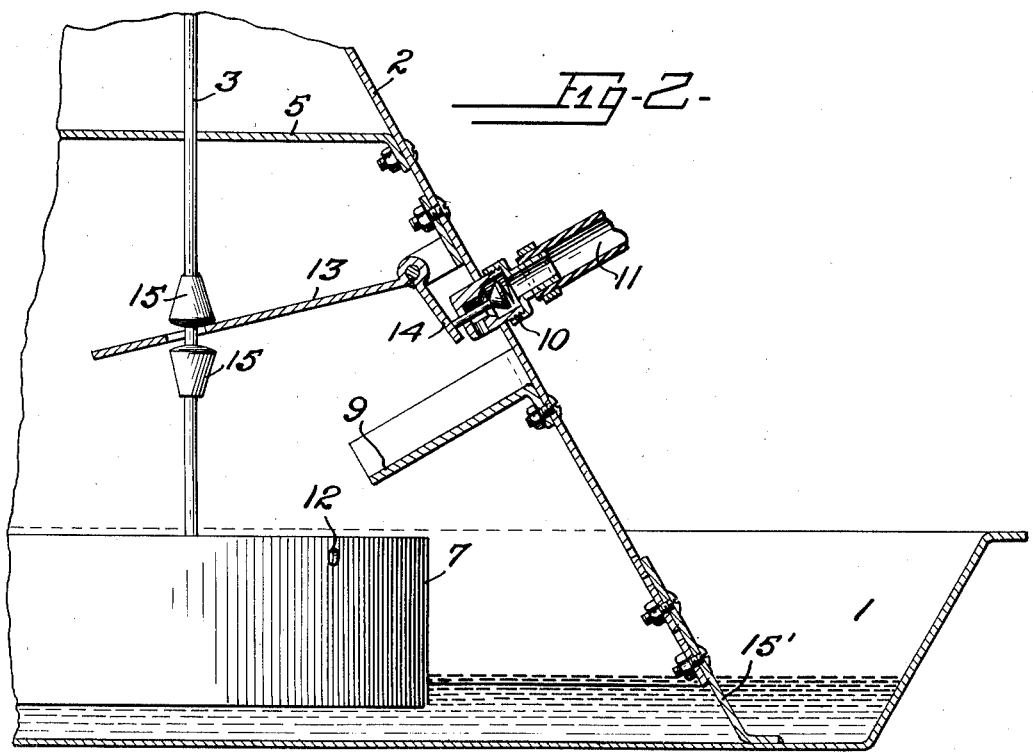
Fig-2-
Leonard A. Smith INVENTOR
BY Victor J. Evans & Co.
ATTORNEY
WITNESS Patented May 29, 1934

1,961,092

UNITED STATES PATENT OFFICE 1,961,092

AUTOMATIC WATERER

Leonard A. Smith, Stuart, Fla.

Application July 11, 1933, Serial No. 679,939

2 Claims. (Cl. 119—80)

This invention relates to automatic watering devices for chickens or animals and has for the primary object the provision of a device of the above stated character provided with means whereby a predetermined amount of water may be kept in the drinking pan of the device and which amount may be varied to meet with different conditions which may arise during the use of the device.

Another object of this invention is the provision of means whereby the device may be easily and quickly disassembled for cleaning and also for storing and further which device is provided with means to permit convenient connection to be made with a water hydrant and which will permit adjustment or moving of the device a limited distance with respect to the hydrant.

With these and other objects in view this invention consists in certain novel features of construction, combination and arrangement of parts to be hereinafter more fully described and claimed.

For a complete understanding of my invention, reference is to be had to the following description and accompanying drawing.

In the drawing:

Figure 1 is a side elevation, partly in section, illustrating an automatic watering device constructed in accordance with my invention.

Figure 2 is an enlarged fragmentary sectional view illustrating the same.

Referring in detail to the drawing, the numeral 1 indicates a drinking pan supporting a conical shaped guard 2, the apex of which is disposed uppermost and apertured to slidably receive a rod 3 carrying at its upper end an eye or loop 4 providing a finger piece and also a medium to receive a hook or like support for retaining the guard in a suspended position while not in use. The rod 3 is guided in its movement by a brace 5 secured to the guard and a float 7 is carried by the lower end of the rod and operates in the water contained in the pan. The upper portion of the float is flanged to form a shallow recess 8 in which is received water from a trough 9 carried by the guard. A self-closing valve 10 is carried by the guard directly above the trough and is detachably connected to a water supply by a flexible hose 11. The discharge end of the valve is disposed over the trough so that when the valve is opened the water may flow onto the float or within the recess 8 thereof. A comparatively small opening 12 is provided in the flanged portion of the float to permit slow passage of water from the recess into the pan 1.

A lever 13 is pivoted to the guard 2 above the valve and carries at its pivoted end an arm 14 adapted to engage the valve for unseating the latter. The lever 13 is slotted to receive the rod 3 between spaced shoulders 15 on the rod so that the upward and downward movement of the rod by the float rising and falling with the water in the pan, will cause the lever 13 to be rocked to unseat and permit closing of the valve.

When the water in the pan reaches a low level, the float descending with the water unseats the valve, allowing the water from the supply to flow into the trough onto the float and overflow the recess 8 into the pan 1. As the water rises in the pan 1 to a determined level, the float through the lever 13 releases the valve and permits the latter to close, cutting off the supply of water. The water in the recess 8 gradually drains therefrom due to the fact that the opening 12 is located adjacent the bottom wall of the recess. The purpose of the recess 8 receiving the water and the latter draining slowly therefrom by the opening 12 is to obviate opening and closing the valve 10 by slight rise and fall of the water in the pan.

Legs 15' are adjustably secured to the guard and rest upon the bottom of the pan with the lower edge of the guard arranged within said pan. The legs permit the guard to be adjusted towards and from the bottom of the pan and this adjustment varies the action of the float to open and close the valve thereby permitting the device to be regulated to contain different amounts of water within the pan 1.

The hose 11 connecting the valve to the water supply will permit the guard to be removed from the pan 1 without disconnecting the device from the water supply. This is desirable when cleaning the pan of foreign matter and also permits the location of the device to be varied for a limited distance with respect to the water supply.

Should it be desired to move this device from one place to another while connected to the water supply the same can be accomplished without danger of the valve being opened and admitting water to the pan at this time. The device when moved is lifted by the ring upon the rod, causing an upward movement of the rod until the shoulders engage the brace, moving the lever on its pivot away from the valve and permitting the latter to remain seated. It is also to be noted that the employment of a guard of conical shape will prevent chickens or animals from stepping in or standing within the pan but still gives them free access to the pan for drinking purposes. If the device is tilted over accidentally, the float would gravitate inwardly of the guard preventing the turning on of the water supply due to the fact that the lever is moved on its pivot away from the valve. The guard being of conical shape will prevent roosting of fowl thereon when in an upright position or when the device is positioned for use as a watering medium.

While I have shown and described the preferred embodiment of my invention, it will be understood that minor changes in construction, combination and arrangement of parts may be made without departing from the spirit and scope of my invention, as claimed.

Having described the invention, I claim:

1. An automatic watering device comprising a pan, a conical-shaped guard extending into the pan and adjustable relative to the latter, a self-closing valve carried by the guard, flexible means for connecting the valve to a water supply, a float carried by the guard and operating in the water of the pan, means between the float and the valve to unseat the latter by the fall of the water in the pan to a predetermined level, said float adapted to release the valve on the rise of the water in the pan to a predetermined amount, said float having formed therein a recess, a trough carried by the guard for directing water from the valve to the recess, said water after filling the recess adapted to overflow into the pan, said float having an opening in communication with the recess to permit slow draining of the water from the recess into the pan.

2. An automatic water device comprising a conical-shaped guard, legs adjustably secured to said guard, a pan receiving the lower portion of the guard with the legs resting upon the bottom wall of the pan, a rod slidable through the apex of the guard and bent to form a supporting eye, a float carried by said rod and operating within the water of the pan, a self-closing valve carried by the guard, a flexible hose connecting the valve to the water supply, a pivoted lever on the guard connected to the rod for unseating the valve by the float moving downwardly with the fall of the water in the pan to a predetermined level, a trough carried by the guard and receiving the water from the valve and directing said water onto the float, said float having a recess to receive the water from the trough, said float having an opening to permit draining of the water from said recess into the pan.

LEONARD A. SMITH.